C. C. RUMERY AND F. G. SPATES.
HOT WATER MOTOR APPLIANCE.
APPLICATION FILED NOV. 11, 1920.
1,414,751.
Patented May 2, 1922.
2 SHEETS—SHEET 2.
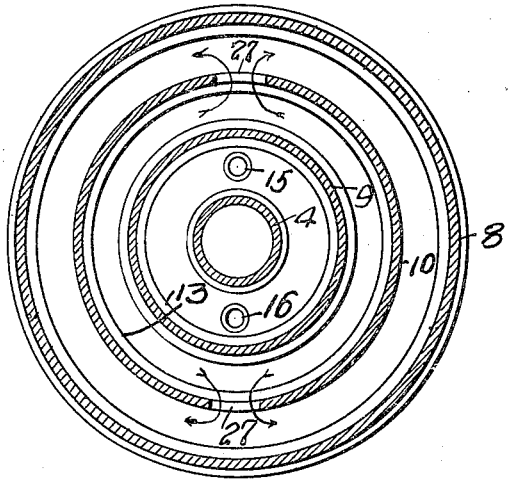
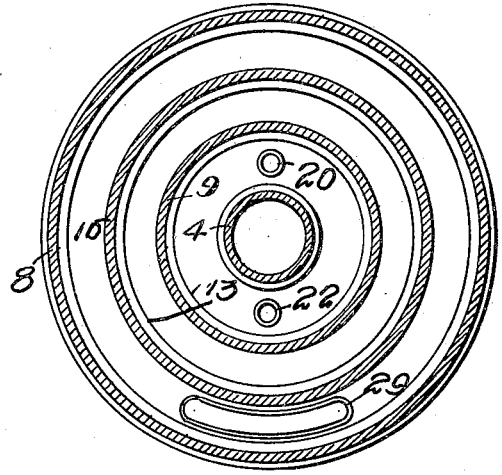
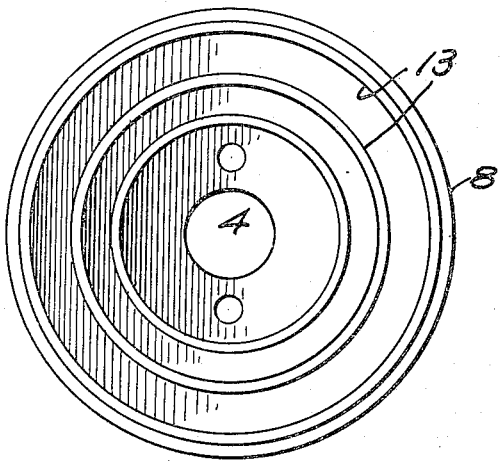
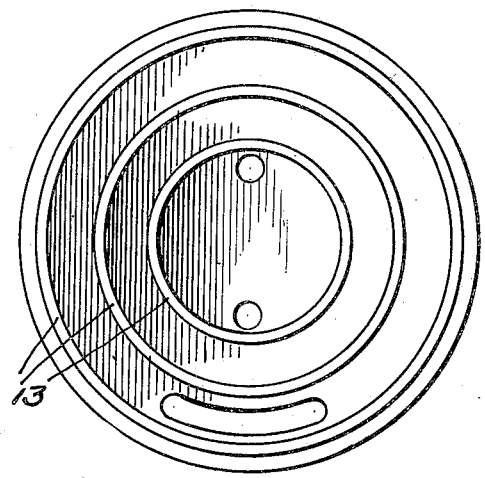
INVENTORS
Charles C Rumery
BY Frank G. Spates
Their ATTORNEYS.

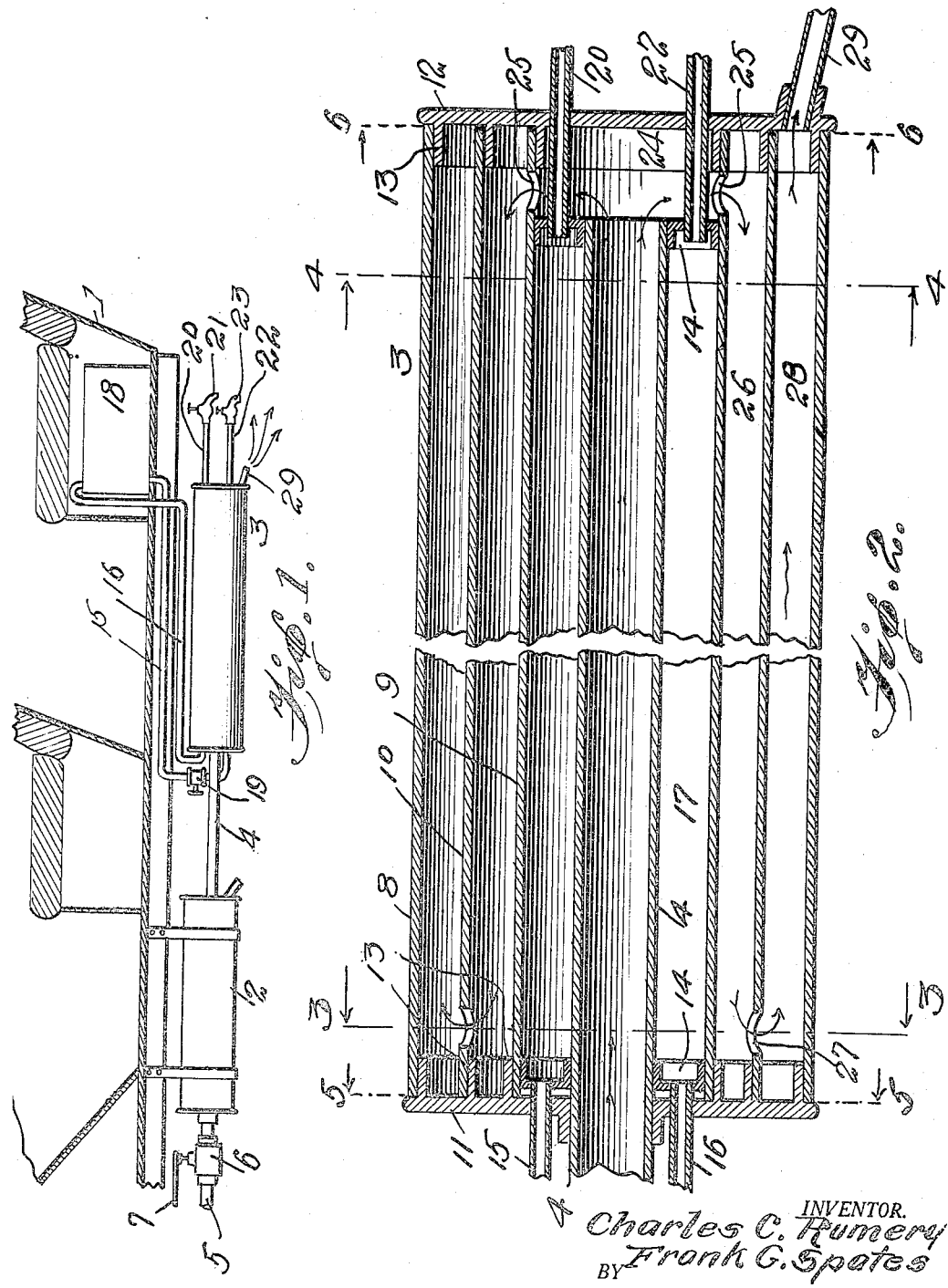

UNITED STATES PATENT OFFICE.

CHARLES C. RUMERY AND FRANK G. SPATES, OF EASTPORT, MAINE.

HOT-WATER MOTOR APPLIANCE.

1,414,751.　　　　　Specification of Letters Patent.　　Patented May 2, 1922.

Application filed November 11, 1920. Serial No. 423,469.

*To all whom it may concern:*

Be it known that we, CHARLES C. RUMERY and FRANK G. SPATES, citizens of the United States, residing at Eastport, in the county of Washington and State of Maine, have invented certain new and useful Improvements in Hot-Water Motor Appliances, of which the following is a specification, reference being had therein to the accompanying drawings.

This invention relates to an apparatus for quickly heating water, or any liquids that the operator may desire to heat, and the object of the invention is to utilize the exhaust gases of a motor vehicle or motor vessel for heating the water in our apparatus, carried or attached in a suitable manner to the motor vehicle.

Another object of the invention is the provision of an efficient apparatus, carried by a motor vehicle, so that water may be heated while traveling, whereby hot water will be readily accessible when the motor vehicle stops; often, it is desirable to have hot water ready for picnic purposes, or for other purposes, when the occupants of an automobile reach their destination, and for this purpose we have provided our simple apparatus, hereinafter specifically described.

With these and other objects in view, our invention comprises certain novel combinations, constructions and arrangements of parts as will be hereinafter described, illustrated in the accompanying drawings, and more particularly pointed out in the appended claims.

In the drawings:

Figure 1 is a view, in elevation, of our apparatus showing the same as it appears in operation.

Figure 2 is a longitudinal, sectional view of the apparatus.

Figure 3 is a sectional view, taken on line 3—3, Fig. 2, and looking in the direction of the arrows.

Figure 4 is a sectional view, taken on line 4—4, Fig. 2, and looking in the direction of the arrows.

Figure 5 is a view taken on line 5—5, Fig. 2, looking in the direction of the arrows, of the intake-end closure cap.

Figure 6 is a view taken on line 6—6, Fig. 2, looking in the direction of the arrows, of the outlet-end closure cap.

Referring to the drawings by numerals, 1 designates the motor vehicle (Fig. 1), 2 the muffler, and 3 our heating apparatus. The exhaust pipe 4 is connected by valve 6 to pipe 5; valve 6 is also connected to muffler 2. Valve 6 is used to divert the gases from the muffler 2 into the exhaust pipe 4, at the will of the operator of the motor vehicle through the medium of operating rod 7. However, as the muffler 2 and valve 6 can be of any ordinary type, we merely show them generally as they do not constitute, in their specific structure, a part of our apparatus. Our apparatus 3 comprises an outer casing 8, an inner casing 9 and an intermediate casing 10.

The intake-end closure cap 11 is fastened upon the intake-end of the casings 8, 9 and 10, and the outlet-end closure cap 12 is fastened to the outlet-ends of said casings, Fig. 2. The caps 11 and 12 are each provided with three rings 13 engaging the ends of the casings 8, 9 and 10; the ends of the casings overlap and rest snug against these annular rings 13, of the end-caps.

The inner casing 9 has a double-flanged ring 14 placed therein at its inlet-end, and spaced a short distance from the end of this casing, Fig. 2, whereas at its other or outlet-end, a similar double-flanged closure ring 14 is spaced a considerable distance from the end of the casing 9 away from the end cap 12.

Liquid (water) supply and circulating pipes 15 and 16 are connected at their lower ends (Figs. 1 and 2) to the ring 14 at the inlet end of casing 9, to allow water to circulate from the water chamber 17 through the pipes to the supply tank 18 in the motor vehicle 1; a valve 19, on the pipe 15, controls the flow of the water from supply tank 18 to the chamber 17. To the ring 14, at the outlet end of the casing 9, is connected the discharge pipe 20, provided with a faucet 21, from which pipe 20 hot water can be drawn before the tank is fully heated, and a discharge pipe 22, (provided with a faucet 23) is also provided; these pipes 20 and 22 extend through the closure cap 12, as per Fig. 2. The exhaust pipe 4 extends through the closure cap 11, ring 14 at the inlet end of the apparatus, and longitudinally through the casing 9, as well as the ring 14 at the outlet end of the apparatus; the exhaust pipe is flush with the outer face of the ring 14 at the discharge end of the apparatus, allowing the exhausted gases to pass through pipe 4 and be discharged into a compartment 24 formed at the discharge end of the inner casing 9, thence the discharge gases passing through openings 25, in the casing 9, into the chamber 26 traveling the length of the chamber to its opposite end, thence passing through the ports or apertures 27, formed in the intermediate casing 10, thence passing the length of the chamber 28 and are discharged through the discharge pipe 29 to the outer atmosphere. Discharge pipe 29 can be automatically closed after water is heated and gases are diverted from the apparatus to and through the regular muffler, thereby retaining the heat in the apparatus.

It is to be noted that water contained in the water compartment or chamber 17 will be heated by the discharge pipe 4 passing through the center of the chamber 17 and also by the heat units acting upon the inner casing 9, resulting in the quick heating of the water in chamber 17.

The chamber 17 can be kept clean by reason of opening the faucets 21 and 23, allowing the flushing of the pipes and chamber, as well as supply tank 18, containing the water.

The end caps 11 and 12, and the other parts of the apparatus can be securely fastened together by any ordinary means such as welding or fastening the parts together by bolts, not shown, because these expedients are old and obvious.

The placing of the ring 14 slightly within the inlet end of the inner casing 9 affords a rigid connection as the pipes 15 and 16 are securely fastened to the ring and are strengthened against bending at their inner ends by passing through the cap 11.

We have produced a very durable and efficient apparatus for the heating of liquid, and know that this device will be a great advantage in providing hot water at any time desired by occupants of an automobile during touring times, or when an occupant, or occupants are on a picnic or on a pleasure trip.

While we have described the preferred embodiment of my invention, and have illustrated the same in the accompanying drawings, certain minor changes or alterations may appear to one skilled in the art to which this invention relates, during the extensive manufacture of the same and we, therefore, reserve the right to make such alterations or changes as shall fairly fall within the scope of the appended claims.

What we claim is:

1. In an apparatus of the class described, the combination of an outer casing, an inner casing within said outer casing, an intermediate casing between said inner and outer casings, an exhaust pipe extending through one end of the outer casing and partly through the inner casing terminating short of the discharge end of the outer casing, means in the inner casing and surrounding the discharge pipe for producing a water chamber within the inner casing and around the exhaust pipe, said inner casing provided contiguous to the discharge end of the exhaust pipe with outlet openings, said outlet openings communicating with a chamber formed between the inlet casing and the intermediate casing, said intermediate casing provided with outlet openings at the opposite end to the outlet openings formed in the inner chamber, means carried by the outer casing at the opposite end of the intermediate casing to that provided with the outlet openings for permitting gases to be discharged to the outer atmosphere, and inlet and outlet pipes extending through the ends of the inner casing and communicating with the water chamber formed between the inner casing and the exhaust pipe.

2. In an apparatus of the class described, the combination of an outer casing, an inner casing within the outer casing, and an intermediate casing between the inner casing and the outer casing, an exhaust pipe extending into the inner casing, means carried by the inner casing and connected to the exhaust pipe to form a water chamber between the inner casing and exhaust pipe, chambers formed between the inner, intermediate and outer casings, said inner and intermediate casings provided with outlet ports or openings whereby gases may pass from the discharge pipe into the chambers between the inner, intermediate and outer casings, means carried by the casings for permitting gases to be discharged to the outer atmosphere, and pipes in communication with the water chamber formed between the exhaust pipe and the inner casing.

3. In an apparatus of the class described, the combination of an outer casing, an inner casing and an intermediate casing, closure caps provided with annular rings resting against the ends of the casings and having the casings overlapping the same, double flanged rings in the inner casing, the double flanged ring at the inlet end of the inner casing being slightly spaced from the contiguous end cap, the double flanged ring at the discharge end of the inner casing being a considerable distance from the contiguous end cap producing a compartment and the inner casing having discharge openings opening into said compartment and also into a compartment formed between the inner casing and the intermediate casing, said intermediate casing provided with discharge openings at the end opposite to the end of the inner casing having the discharge openings, the closure cap on the discharge ends of the casings being provided with a discharge opening opening into the chamber formed between the outer and intermediate casings, pipes extending through the intake-end closure cap and through the double flanged ring contiguous thereto and communicating with the water chamber formed between the exhaust pipe and the inner casing, and pipes extending through the outlet-end closure cap and through the double flanged ring at the discharge end of the inner casing and the exhaust pipe, substantially as shown and described.

In testimony whereof we hereunto affix our signatures.

CHARLES C. RUMERY.
FRANK G. SPATES.